United States Patent [19]

Hartheimer et al.

[11] Patent Number: 5,289,578
[45] Date of Patent: Feb. 22, 1994

[54] ACTIVATION OF A DORMANT SIBLING COMPUTER IN A COMMUNICATION NETWORK BY OVERRIDING A UNIQUE DORMANT NODE ADDRESS WITH A COMMON ACTIVE NODE ADDRESS

[75] Inventors: Richard Hartheimer, Morris Plains, N.J.; Michael Coleman, Sydney, Australia; Chris Klepka, Parsippany, N.J.; Geoffrey Poole, Sydney, Australia

[73] Assignee: Foreign Exchange Transaction Services, Inc., Long Island City, N.Y.

[21] Appl. No.: 612,045

[22] Filed: Nov. 9, 1990

[51] Int. Cl.$^5$ ............................................. G06F 13/00
[52] U.S. Cl. ..................................... 395/200; 395/575; 364/242.96; 364/284.4; 364/285; 370/60; 370/93; 340/825.07
[58] Field of Search ................. 395/575, 200; 371/9.1; 364/187; 370/60, 93; 340/825.07

[56] References Cited

U.S. PATENT DOCUMENTS

| | | | |
|---|---|---|---|
| 4,775,976 | 10/1988 | Yokoyama | 371/9 |
| 4,823,256 | 4/1989 | Bishop et al. | 395/575 |
| 4,920,484 | 4/1990 | Ranade | 395/200 |
| 4,926,375 | 5/1990 | Mercer et al. | 395/575 |
| 4,975,838 | 12/1990 | Mizuno et al. | 395/575 |
| 4,977,499 | 12/1990 | Banning et al. | 395/200 |
| 4,985,830 | 1/1991 | Atac et al. | 395/200 |
| 5,039,980 | 8/1991 | Aggers et al. | 340/506 |
| 5,058,056 | 10/1991 | Hammer et al. | 395/575 |
| 5,058,057 | 10/1991 | Morita et al. | 395/575 |
| 5,077,655 | 12/1991 | Jinzaki | 395/200 |
| 5,086,384 | 2/1992 | Fukada | 364/187 |
| 5,121,486 | 6/1992 | Kurihara et al. | 395/325 |
| 5,125,076 | 1/1992 | Faber et al. | 395/200 |
| 5,167,035 | 11/1992 | Mann et al. | 395/575 |
| 5,191,651 | 3/1993 | Halim et al. | 395/200 |
| 5,198,805 | 3/1993 | Whiteside et al. | 340/825.06 |

OTHER PUBLICATIONS

Quotron Systems, Inc., "Quotron F/X Trader System Overview," Winter 1989/90.
Quotron Systems, Inc., "Quotron F/X Trader Beta Version User Manual," Spring 1990.
Quotron Systems, Inc., "Quotron F/X Trader Beta Version System Administration Manual," Spring 1990.
Quotron Systems, Inc., "Interactive Demo Script", with copies of display screens as shown in Lisbon, Portugal, Spring/Summer 1989.
J. G. Sams; "Node Processor for Distributed System Control"; IBM Technical Disclosure Bulletin; vol. 23 No. 5 Oct. 1980 pp. 1811-1812.

Primary Examiner—Parshotam S. Lall
Assistant Examiner—Krisna Lim
Attorney, Agent, or Firm—Robbins, Berliner & Carson

[57] ABSTRACT

A respective unique dormant address is permanently associated with each of two sibling computers located at a particular node of a communications network. A selected one of the sibling computers is activated by associating an overriding common active node address with the selected computer. Application programs running at other nodes of the network utilize this active node address and thus interface with whichever sibling computer is identified by the active node address. Accordingly, the dormant computer and its physical connection to the network may be monitored by the communications software using its unique dormant address and the dormant computer is always available to replace the active computer in a manner that is transparent to any other computers connected to other nodes of the network.

2 Claims, 6 Drawing Sheets

| USD/DEM | 1.6709-14 | CITQ | USD/JPY | 146.35-40 | DGBF | 10:49 |
| USD/DEM | 1.6711-16 | SBZZ | USD/JPY | 146.35-36 | CHKL | 10:49 |
| USD/DEM | 1.6710-16 | CHEN | GBP/USD | 1.7115-25 | NWBL | 10:51 |
| USD/CHF | 1.4730-40 | UBZA | GBP/USD | 1.7116-26 | BBIL | 10:50 |

SELECTED 4 ⇧ | 1 BOAL | 2 AMXL | 3 CMBT | 4 CHMN | 5 | 6
OTHER 12 ⇩ | USD/DEM | USD/DEM | USD/DEM | USD/DEM | | 
 | | 10 | 5+ | | |

BOAL USD/DEM 10USD 23-MAY

CALL ALREADY IN PROGRESS

[CLEAR]

Fig. 2

ACTIVATION OF A DORMANT SIBLING COMPUTER IN A COMMUNICATION NETWORK BY OVERRIDING A UNIQUE DORMANT NODE ADDRESS WITH A COMMON ACTIVE NODE ADDRESS

TECHNICAL FIELD

The present invention relates generally to a computer based communications network, and more particularly to a method of operating a dormant sibling computer at a particular node of the communications network so that it may selectively be made accessible to application programs resident in other computers.

CROSS-REFERENCE TO RELATED APPLICATIONS

For a more comprehensive view of what is presently regarded as the best mode of practicing the invention and its intended environment, reference should be made to the following commonly assigned U.S. patent applications filed concurrently herewith on Nov. 2, 1990:

"Detection and prevention of Duplicate Trading Transactions over a Communications Network" (U.S. patent application Ser. No. 07/608,642)

"Financial Exchange System Having Automated Recovery/Rollback of Unacknowledged Orders" (U.S. patent application Ser. No. 07/608,643)

"Terminal for Automated Trading System having Streamlined User Interface" (U.S. patent application Ser. No. 07/608,645)

The following documents published by Quotron Systems, Inc. describe various aspects of a trading system which embodies many aspects of the present invention and which is available for commercial use under the trademark "F/X Trader":

"Quotron F/X Trader System Overview," Winter 1989/90.

"Quotron F/X Trader Beta Version User Manual," Spring 1990.

"Quotron F/X Trader Beta Version System Administration Manual," Spring 1990.

Copies of the foregoing documents are included as part of the above-cited application entitled "Detection and Prevention of Duplicate Trading Transactions Over a Communications Network" and are hereby incorporated by reference.

BACKGROUND ART

A computer network comprises a plurality of nodes that are connected together to allow for the exchange of data between computers located at different nodes. In most networks, certain of the computers are particularly critical and a serious degradation of functionality results if such a computer malfunctions, or otherwise is inaccessible, for an extended period of time. Not only is communication with the faulty computer interrupted, but any associated network functions performed by the computer remain unexecuted, potentially causing considerable havoc.

The magnitude of this problem can be reduced by providing two computers at each node, for example a main and a backup computer. Thus, when the main computer breaks down, the backup computer can take its place. However, implementing a system that can switch computers at the nodes can be difficult. The difficulty arises from the fact that each computer connected to the network must be identified by a unique address, and the network must be aware of the unique address of each computer in order to access it.

Prior art addressing schemes are generally cumbersome. For example, in one scheme (where a network has a main and backup computer at a first node, and a plurality of other nodes, the structure of the other nodes being unimportant), the address that the other nodes use to access the two computers at the first node must be changed from the address of the main computer to the address of the backup computer. However, this puts a large burden on each of the network nodes to recognize when the addresses must be changed.

SUMMARY OF THE INVENTION

The present invention provides a method for identifying redundant sibling computers in a communications network having at least one node with a pair of sibling computers, one normally active and the other normally dormant. The sibling computer are identified by permanently associating a unique dormant address to each sibling computer, selecting one of the computers to be active and thereafter associating an overriding common active address to the selected computer. Any application programs running on the network need only specify the common active address for that particular node in order to interface with whichever sibling computer has been selected as the active computer at that node.

While one sibling computer is in active mode, the other sibling computer must be in dormant mode. The two sibling computers cannot be active at the same time; however, both of them can be in dormant mode simultaneously. These constraints are ensured by an appropriate start-up process for each sibling computer.

When each computer is started up, it first determines whether any other sibling computer in the node is identified by the common active node address. If it is not, then the sibling computer may assume its active mode by temporarily removing itself from the network, changing its network address to equal the active node address, and using that active node address to re-connect itself to the network.

BRIEF DESCRIPTION OF THE DRAWINGS

Other objects and features of the present invention will be apparent from the following description of a presently preferred embodiment taken in connection with the accompanying drawings, in which:

FIG. 2 is a schematic diagram illustrating an exemplary display screen of the trading system having a plurality of windows disposed therein;

DETAILED DESCRIPTION OF THE PREFERRED EMBODIMENT

Figure 1:
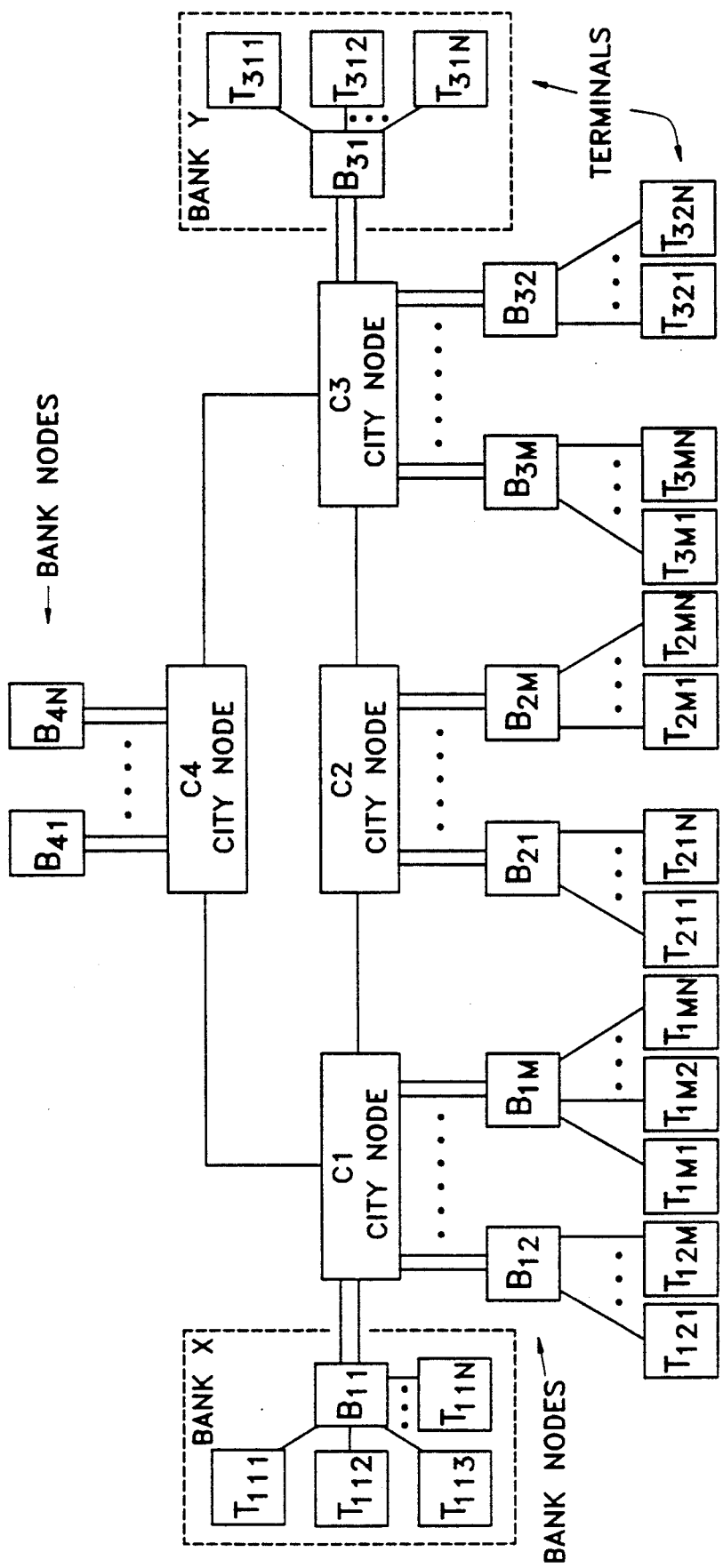
FIG. 1 is a system level schematic representation of a city network system having bank nodes connected thereto.

Referring initially to FIG. 1, an exemplary network of trading terminals is shown. The network comprises a plurality of city nodes C1 to C4, each connected to at least one bank node B11 to B4M. Each bank node is in turn connected to at least one trading terminal T111 to T3MN. The bank and city nodes generally provide a routing network and supervisory functions to allow a trading terminal connected to one bank node to communicate with a trading terminal (or trading terminals) connected to another bank node (or bank nodes). The detail of the network structure is not important to an understanding of the present invention. Suffice it to say that the city nodes may be located in any city, and the city nodes may be connected in any combination necessary to facilitate the routing of calls from city to city and from bank node to bank node. For example, the city nodes may be located in the cities indicated in FIG. 1 wherein city node C1 is located in Tokyo, city node C2 in New York, city node C3 in Zurich and city node C4 in London.

The route over which messages are routed is invisible to the traders using the trading terminal. For example, a foreign exchange trader using the trading terminal T111 in Bank X in Tokyo can communicate with a foreign trader using the terminal T311 at Bank Y in Zurich. The message from Bank X to Bank Y initiates at terminal T111, is routed through the bank X bank node B11 and then through the Tokyo city node C1. Upon receipt of the message at Bank Y, it gets routed to the Zurich city node, then to the Bank Y bank node B31 and finally to the trading terminal T311. The path that the message takes between the Tokyo C1 and Zurich C4 city nodes is entirely up to the decision making function of the network. For example, the message may go through New York C2 only, or London C3 only, or both New York and London before reaching Zurich.

There are a variety of messages and communications which can occur between traders, however, the most fundamental is a communication regarding the negotiation of the sale or purchase of currency. Briefly, in an exemplary system, the trading conversation is initiated by one trader requesting a quote (RFQ) from another trader. The other trader has a variety of options, the first of which includes whether he will even answer the RFQ. Other options include responding with a quote, or sending written messages back to the requesting party. The conversation is ended by either making a deal or refusing a deal and hanging up.

Referring now to FIG. 2, an exemplary trading terminal screen is shown having a plurality of panels. An indicative rates panel 11 is provided and contains electronically updated indicative trading rates for selected currency pairs, wherein a currency pair is the two types of currency which are to be involved in the potential transaction. Example of currencies are the U.S. dollar (USD), the Great Britain pound (GBP), the Deutsche [German] mark (DEM), the Japanese yen (JPY) and the French franc (FRF).

An incoming call queue panel 12 is also provided. This panel prioritizes and displays the incoming calls arriving at the bank node to which the trading terminal is connected. Calls may also be sent to a particular trader, in which case this too is indicated in the incoming call queue panel. The remaining panels are conversation panels 13. It is in these panels that conversations between traders take place. The six conversation panels allow each trader to simultaneously conduct six trading transactions.

Figure 3:
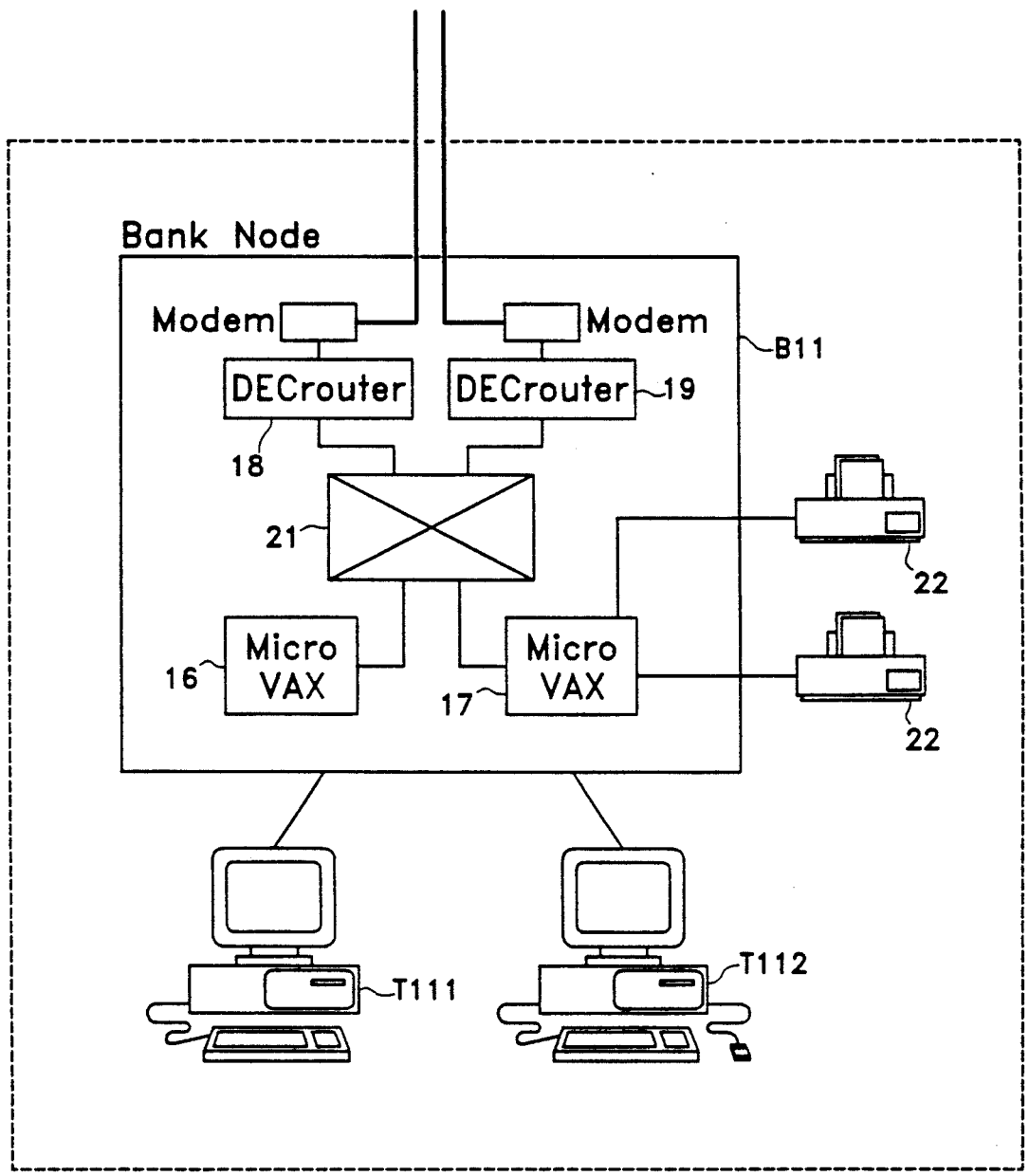
FIG. 3 is a schematic diagram of an exemplary network node having sibling computers.

As shown in FIG. 3, an exemplary duplex bank node B11 has a first and second sibling computer 16 and 17 respectfully (such as MicroVAX computers), a pair of routers 18 and 19 (such as DECrouter 200s) and a switch 21 (such as a DELNI). The function of each component is conventional. Briefly, the routers route signals to and from other nodes. The routers at the bank node route signals to and from a city node and to and from trading terminals corresponding to the bank node. The switch allows either sibling computer to connect with either router.

In addition to these components, the bank node comprises other conventional elements, such as at least one monitor and keyboard (not shown) for operating the sibling computers, modems 23 connected to the DECrouters for facilitating the input/output connection of the DECrouters to other nodes, and printers 22 connected to the sibling computers.

In an exemplary embodiment, the sibling computers run DECnet which is a communications software package. Although a complete understanding of the operation of DECnet is not necessary for an understanding of the present invention, it is helpful to understand that DECnet allows messages to be routed, by means of the DECrouters, between computers at different nodes of the network. When DECnet is up and running at a bank node, that node is available to the network to transmit and receive messages. However, when DECnet is down at a bank node, that node is not available for transmission and reception of any messages, and that node can be considered to be removed from the network.

At any one time, when the bank node is functioning as a network element, one of the sibling computers is active and the other is dormant and the network (i.e. the other nodes in the network) identifies the bank node through recognition of a "published address" installed on the active computer. Although it is possible for both of the sibling computers to be dormant at the same time, only one of the sibling computers can be active at any one time. This condition is ensured by the present invention.

More specifically, each of the sibling computers has a unique address when in the dormant state, i.e., its dormant node address. Each sibling computer can communicate with the network using its dormant node address. However, a single active node address, or published address, is shared between the computers. When one sibling computer is identified by the active node address, the other sibling computer is identified by its unique dormant address. For example, when the first sibling computer 16 is identified by the active node address, the second sibling computer must be identified by its unique dormant address, and vice versa.

It is important to note that each of the sibling computers is connected to the network, and can communicate with the network, regardless of whether it is in an active or dormant state. This is of particular benefit because the operability of the dormant computer can be monitored at any time since it is always part of the network.

Further, since both of the sibling computers are always connected to the network, switching between them is simplified. Switching the active node address from one sibling computer to another may be required where the active computer fails thus necessitating the dormant computer to be activated. Switching between sibling computers may also occur as a preventive measure, such as where the active computer has a minor failure or where preventive maintenance must be performed on the computer.

Figure 4:
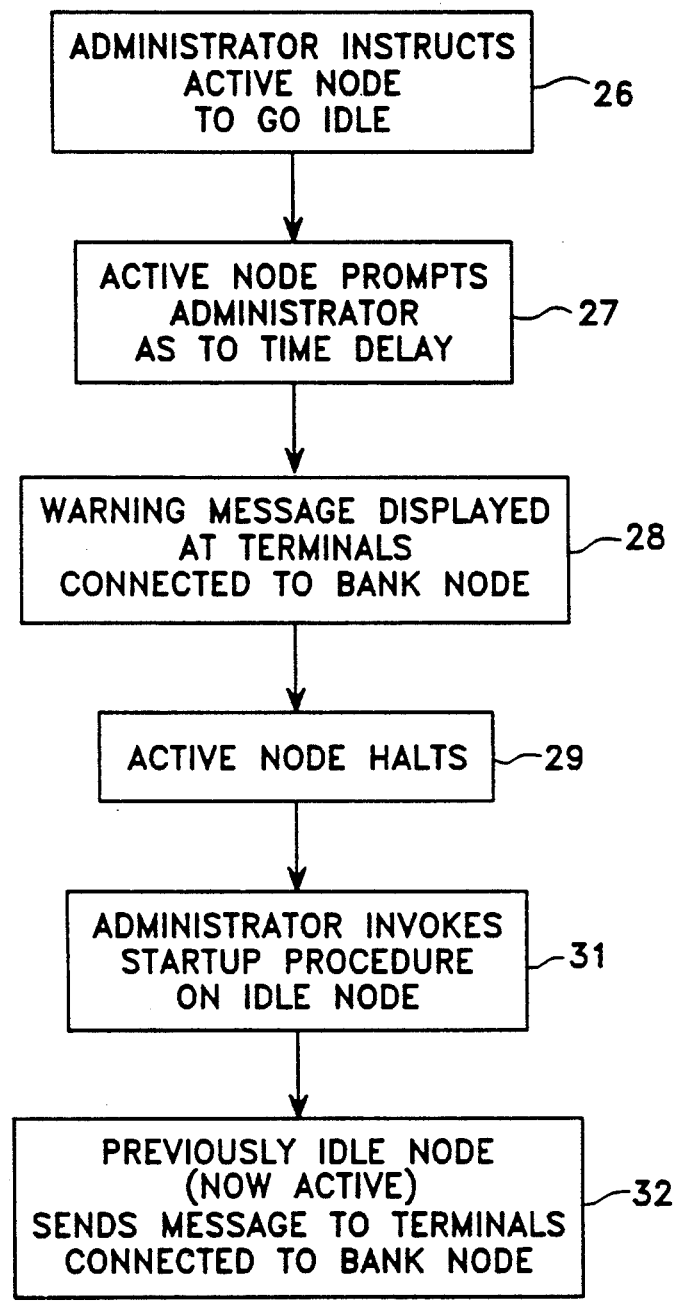
FIG. 4 is a flowchart illustrating, in general, an exemplary method used by a node administrator to swap sibling computers at a bank node.

In an exemplary embodiment, the switching of the sibling computers is accomplished by the commands of a node administrator (i.e. a person who administers the operation of the bank node). FIG. 4 shows an exemplary flow of commands the administrator makes as well as how the sibling computers react.

Recalling that both sibling computers cannot be active at the same time, the first step is for the administrator to instruct the presently active sibling computer, for example the first sibling computer 16, to go idle 26 (i.e. to stop the system). It should be understood that stopping the system can be accomplished in many ways, for example, by saving trading data first or by stopping the system without saving any data. These details are unimportant to the understanding of the present invention. All that need be understood is that stopping the system results in the address of the sibling computer being changed from the active node address to its dormant address.

In the exemplary embodiment, the presently active computer will prompt the administrator as to the length of time the computer should delay prior to going idle 27. Once this information is entered by the administrator, a warning message is displayed 28 at the trading terminals connected to the bank node. An exemplary message is to warn the users that trading will be halted in "X" amount of time. This gives the traders using the terminals time to close their trading communications.

Thereafter, the presently active sibling computer stops 29, thus switching to its dormant mode. The administrator then invokes a start-up procedure 31 on the previously dormant computer, for example the second sibling computer 17. The start up procedure, discussed in conjunction with FIGS. 5A and 5B below, results in replacing the dormant address of the second sibling computer with the active node address thus activating the second sibling computer. The now active sibling computer is then available to receive and transmit messages to the terminals (32) connected to that bank node and trading may once again be allowed.

The administrator may conduct other operations during this process such as saving data stored on the first sibling computer 16 regarding recent trading activity, and thereafter, loading the saved information onto the second sibling computer 17. Preferably, any bank or trader specific information (such as transaction logs, bank-defined trading limits, trader passwords, and trader configuration preferences) maintained by the active bank node computer is automatically backed up each night, by copying it into the dormant sibling (using the dormant computers permanent dormant address).

Figure 5A:
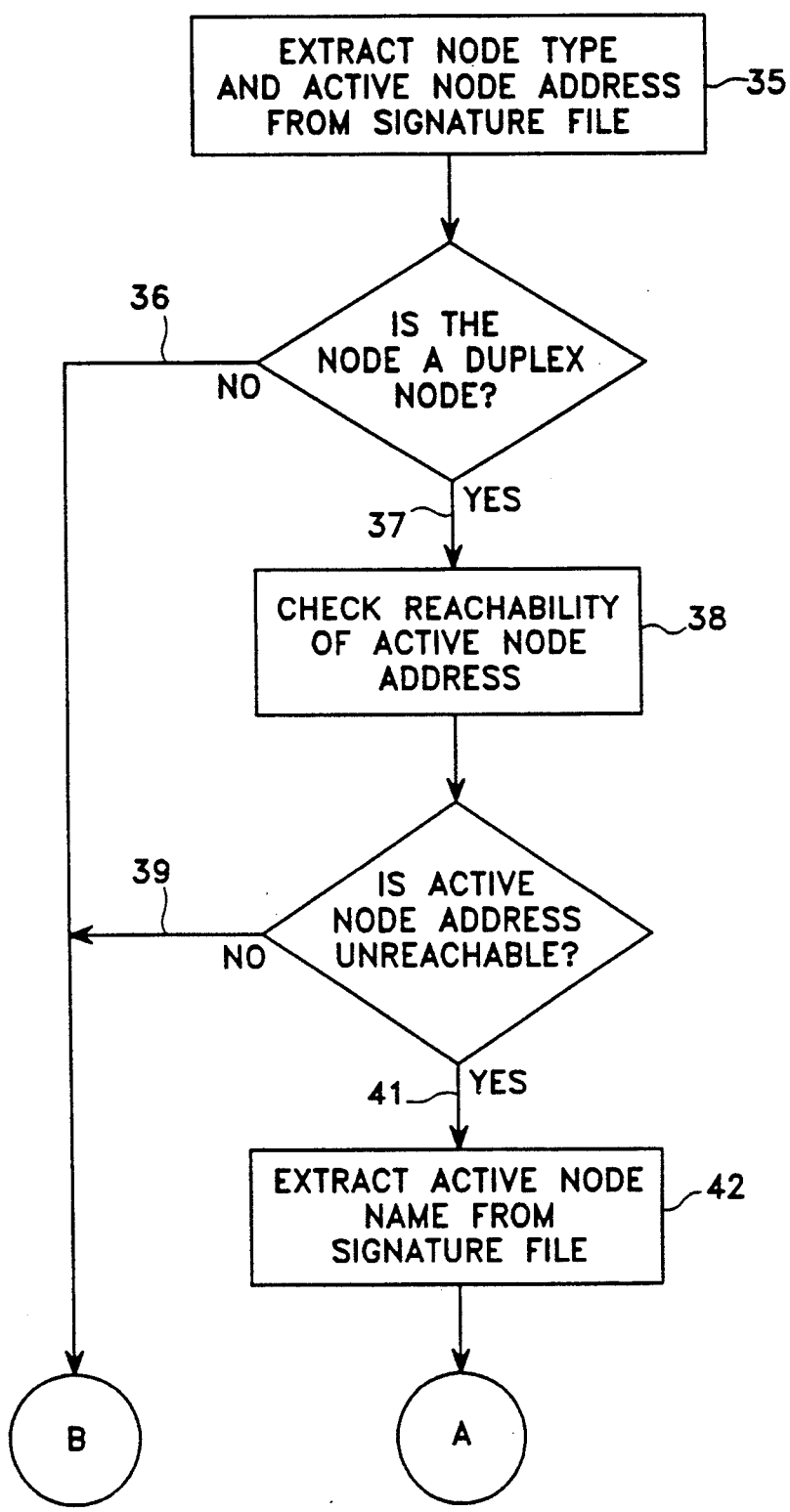
FIGS. 5A and 5B are flowcharts illustrating the start-up sequence of a sibling computer ensuring that only one computer at the node is active.
Figure 5B:
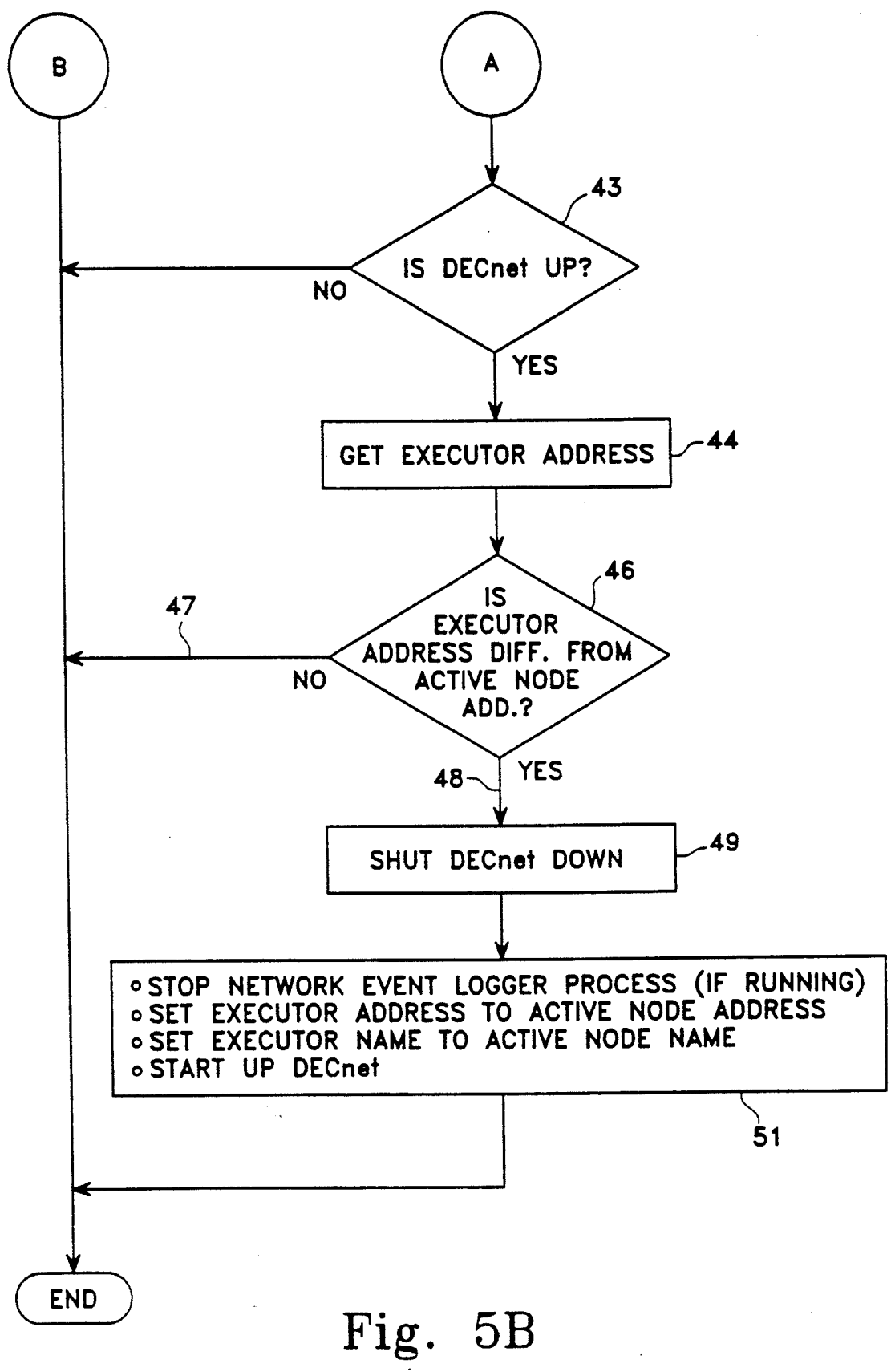

Referring now to FIGS. 5A and 5B, the addressing of each sibling computer is controlled carefully by the start up procedure of each sibling computer. Each computer has in its memory a signature file which contains information regarding the published address (or active node address) for the node, the name of the node and the type of node in which the computer is connected in. For example, the node may contain only one computer, or, it may be a duplex node which contains a pair of sibling computers. The present invention concerns only sibling computers resident in duplex nodes.

Thus, when a computer is started up, the node type and the active node address is extracted from the signature file 35. If the node is not a duplex node 36, then the software does not have to invoke the method of the present invention, and the method ends. However, if the node is a duplex node 37, the method continues and the active node address is checked for "reachability" 38. In other words, the computer being started up tries to access a computer node having the active node address if found in the signature file. If such a computer can be reached 39, then there is already a computer in the duplex node that is in active status, and the method ends to prevent both of the computers from being identified by the active node address. For example, if the second sibling computer 17 is being started up and it finds a computer in the node using the active node address, then the first sibling computer 16 must already be active.

If, however, a node having the active node address was not reached 41, then the active node address is available to be installed in the computer being started up. Note that when the computers at the bank node are first started up, these steps ensure that only the first of the sibling computers on which the start-up procedure is run on is assigned the active node address for the bank node. Similarly, when the administrator is attempting to swap sibling computers, these steps ensure that the previously active sibling computer has indeed been placed in its dormant state.

The following step, as shown in FIGS. 5A and 5B, is to extract the active node name from the signature file 42. Similarly to the addressing scheme, the bank node has a single node name which is used by the sibling computers when in their active state. Also, each sibling computer has a unique node name associated to its operation in a dormant state.

It is then determined whether DECnet is up 43. If it is up, then the following step is to get the executor address of the computer on which the start-up procedure is being run 44. The executor address is the address that the computer is currently identified by. Thus it may be either the active node address or the computer's dormant address. In the next step 46, if it determined that the executor address is the same as the active node address 47, then the start-up process ends since the computer is already running in active status. However, if the executor address is different from the active node address 48, then the next step is to shut down DECnet 49.

In an exemplary system, shutting down DECnet may require several steps. For example, it may be necessary to wait until a wait count is exceeded, or to stop a remote terminal ancillary control process if one is running. These contingencies are particular to DECnet and are not unique to the present invention. Further, there may be situations where DECnet will not shutdown. In these situations, an error message is displayed indicating that the attempt to set the computer active has been aborted.

In any event, DECnet must be shut down since the bank node must be "removed" from the network to change the addresses of the computers in the node. Once DECnet is shutdown, any network event process that is running is stopped, the executor address is set to the active node address, the executor name is set to the active node name and DECnet is re-started 51. At this point, the computer has been placed in an active state.

While the invention has been shown and described with reference to a presently preferred embodiment, it is understood by those skilled in the art that numerous changes in form and detail may be made therein without departing from the scope of the invention.

For example, while the present invention is described in relationship to the bank node of the foreign exchange trading system shown in FIG. 1, it should be apparent that the principles of the invention is equally applicable to any network having backup or sibling nodes. It should also be understood that the city nodes described in conjunction with FIG. 1 have sibling computers and use the principles of the present invention to address the computers.

We claim:

1. In a communications network having a plurality of nodes, each being identified by a respective active node address, at least one of said nodes being a redundant node having at least two sibling computers sharing a common active node address for communicating over said communications network, a method for identifying the sibling computers comprising the computer implemented steps of:

assigning a unique respective dormant node address different from said common active node address to each sibling computer; and attaching said each sibling computer to the communications network by:

using said unique respective dormant node address to connect said each sibling computer to the network;

determining whether said common active node address is already being used to connect any other sibling computer to the communications network; and if there is no other sibling computer already using said common active node address to connect to the communications network:

temporarily removing said each sibling computer from the network;

assigning said common active node address to said each sibling computer; and using said common active node address to re-connect said each sibling computer to the network.

2. The method of claim 1 further comprising the computer implemented steps of:

removing from the communications network a first sibling computer currently using said common active node address and a second sibling computer currently using a respective said unique dormant address;

re-assigning said common active node address to said second sibling computer; and using said common active node address to re-connect said second sibling computer to the communications network.

* * * * *